United States Patent [19]
Townsend et al.

[11] Patent Number: 5,833,818
[45] Date of Patent: Nov. 10, 1998

[54] LASER WAVEGUIDE

[75] Inventors: Peter David Townsend, Brighton; Philip Ronald Meek, East Sussex; Patricia Jean Thompson Nunn, Hove, all of England

[73] Assignee: British Technology Group Limited, London, England

[21] Appl. No.: 716,419

[22] PCT Filed: Mar. 22, 1995

[86] PCT No.: PCT/GB95/00632

§ 371 Date: Oct. 22, 1996

§ 102(e) Date: Oct. 22, 1996

[87] PCT Pub. No.: WO95/26059

PCT Pub. Date: Sep. 28, 1995

[30] Foreign Application Priority Data

Mar. 22, 1994 [GB] United Kingdom .................... 9405613

[51] Int. Cl.$^6$ ................................................. C23C 14/34
[52] U.S. Cl. ................................. 204/192.26; 204/192.15
[58] Field of Search ........................... 204/192.26, 192.15

[56] References Cited

U.S. PATENT DOCUMENTS 5,018,809  5/1991  Shin et al. ............................. 385/130

OTHER PUBLICATIONS

Patent Abstract of Japan vol. 17 No. 214, 27 Apr. 1993, No. 4–352484.
Soviet Physics Technical Physics vol. 24, No. 4, Apr. 1979 New York US, pp. 518–519.
Electronics Letters vol. 29, No. 7, Apr. 1993 Enage GB, pp. 581–583, XP 000360826 T.H. Hoekstra et al.
Electronics Letters., vol. 28, No. 13, 18 Jun. 1992 Enage GB, pp. 1181–1181, XP 000318580, J.Shmulovich et al.
Applied Optics., vol. 30, No. 3, 20 Jan. 1991 New York US, pp. 276–278 XP 000172775 G.R.J.Robertson et al.

*Primary Examiner*—Nam Nguyen
*Attorney, Agent, or Firm*—Cushman Darby & Cushman IP Group of Pillsbury Madison & Sutro LLP

[57] ABSTRACT

A laser waveguide is made by sputter-depositing an alloy of mainly aluminum and a little dopant e.g., Cr, in an oxidizing atmosphere, onto a heated quartz substrate, and annealing to form ruby, which is then encased in a silica cladding.

10 Claims, 2 Drawing Sheets

LASER WAVEGUIDE

BACKGROUND OF THE INVENTION

This invention relates to a laser waveguide and to a method of making it.

DESCRIPTION OF THE RELATED ART

One of the most useful solid state lasers produced in recent years is the very broad band tunable laser using titanium doped sapphire (Ti:$Al_2O_3$). This has up to 20% conversion efficiency when pumped with an argon laser lamp but needs some 10 W of argon power.

It has therefore been proposed to make the Ti:$Al_2O_3$ in the form of a planar or channel waveguide. This should reduce the pump threshold power by factors of up to 100 (i.e. a pump power down to say 100 mW). Since diode lasers exist at the few watt level one may then be able to drive the tunable laser via a diode with a second harmonic crystal to reach the ideal pump wavelength.

However it would be desirable to improve the economy, performance, reproducibility, and ease of production of such a material.

SUMMARY OF THE INVENTION

According to the invention, a laser waveguide is made by sputter-depositing an alloy of aluminium and dopant onto a waveguide substrate in an oxidizing atmosphere, e.g. oxygen. The dopant may be a transition metal, e.g. Ti, Cr, Co, Fe, and may be present in a proportion of 1 mole:$10^2$ to $10^4$ moles aluminium. The substrate may be any material having transparency, a lower refractive index than the oxidized alloy, and a similar coefficient of expansion to the oxidized alloy. Quartz has proved suitable.

The waveguide may be used when made as set forth above, for example for the ruby waveguide laser. Preferably, however, it is annealed, for example in the temperature range 800° to 1,400° C. in an oxidizing atmosphere in the case of the ruby but alternatively in a reducing atmosphere (particularly hydrogen) in the case of the titanium sapphire. Addition of hydrogen to control the valence state of the titanium impurities may alternatively be controlled by ion implantation of hydrogen following an annealing stage.

To reduce surface scatter losses, the waveguide may be encased (for example by sputter coating) in any material that would be suitable as a cladding, e.g. an overlayer of silica may be applied.

During the sputter deposition, the waveguide substrate is preferably maintained at a predetermined temperature, for example 400° C. to 700° C., more preferably 450°–650° C., e.g. 500° C. or 600° C. or at a temperature around midway (from one-third to two-thirds of the way) between room temperature and the annealing temperature. Such a temperature both helping to minimise the differential expansion between the substrate and the deposited film during annealing on the one hand and during use at room temperature on the other hand, and allows local diffusion during deposition to improve homogeneity of the deposited film.

It is postulated that the deposited film is amorphous and remains so during annealing, which step encourages homogenization and densification. In this case, the deposited film would as a necessary consequence be completely non-epitaxial with the substrate.

DETAILED DESCRIPTION OF EMBODIMENTS

Figure 1:
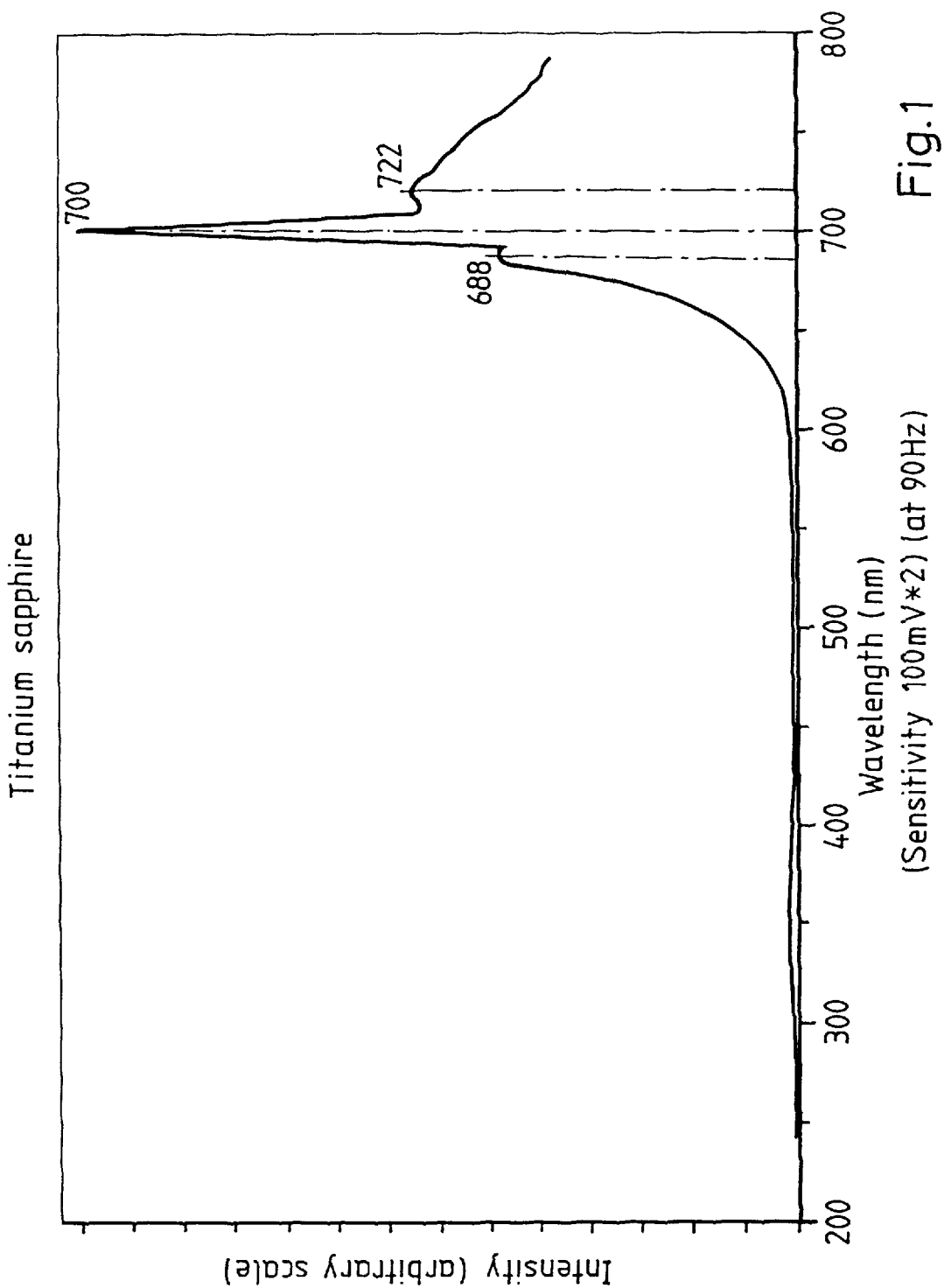
FIG. 1 is a graph showing the relationship of intensity as a function of wavelength (nm) for Example 1.
Figure 2:
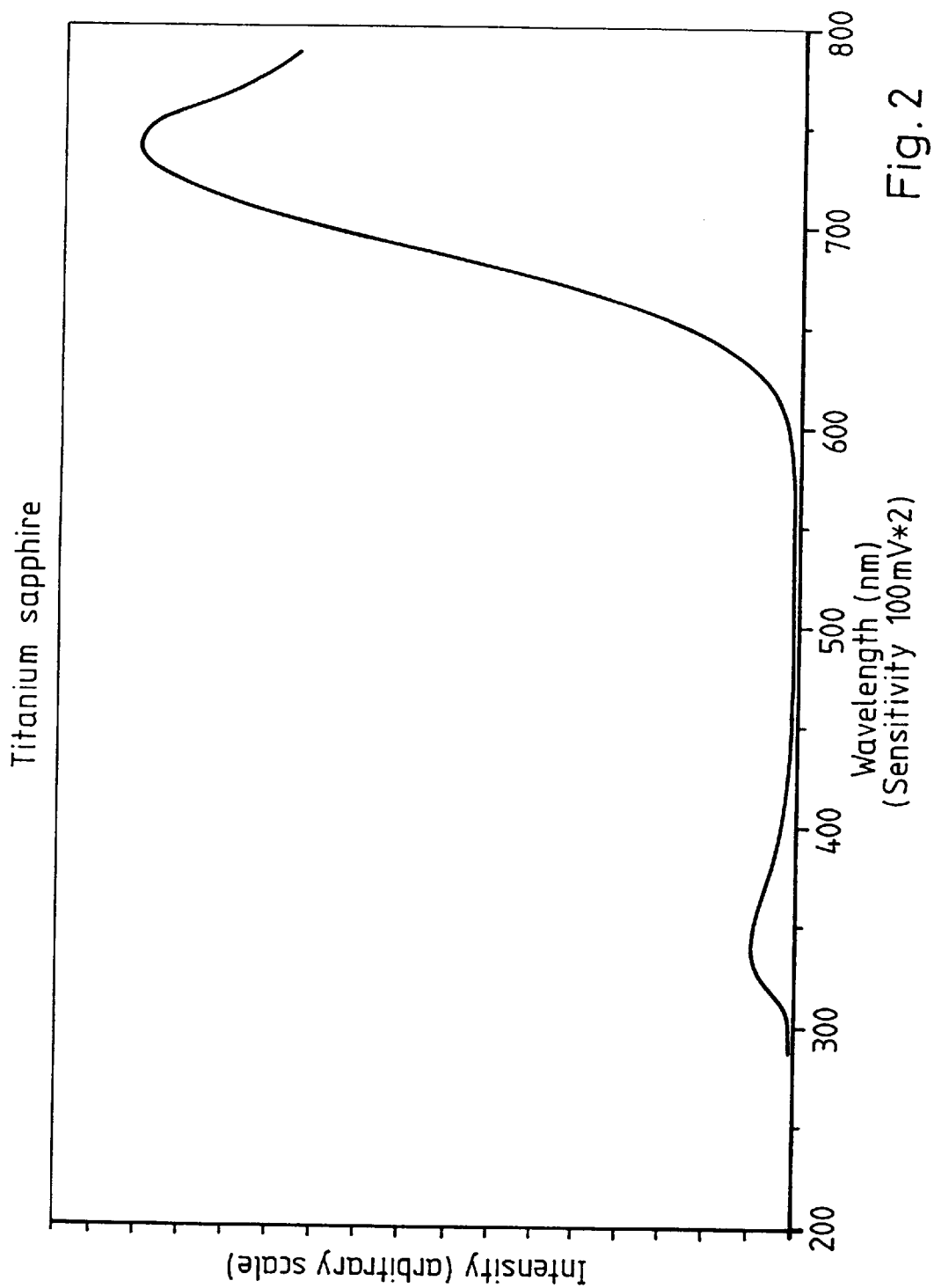
FIG. 2 is a graph showing the relationship of intensity as a function of wavelength (nm) for Example 2.

The invention will now be described by way of example with reference to FIGS. 1 and 2, showing results from Examples 1 and 2, respectively. Examples of deposition conditions which produce waveguides with strong ruby or titanium emission are as follows.

General preparation conditions: a chamber base pressure of $6 \times 10^{-6}$ torr. The operating gas is introduced to a pressure of up to $3 \times 10^{-2}$ torr typically as a mixture of 10 to 30% oxygen and 90 to 70% argon. 10 $O_2$:90 A and 30 $O_2$:70 A both worked, the latter slightly better. An RF plasma has successfully been used but the deposition rate is slow and for more rapid film growth a combination of an RF with DC biased plasma was used, giving a thirtyfold improvement in speed. The sputter source was an alloy made of the required metals, for example 99.6% Al with 0.4% Ti. The alloy composition determines the dopant level in the sapphire film. In the examples, the films were deposited on quartz at room temperature. However, a higher temperature can be used, and the phase transition of quartz at 573° C. (and in suitable cases that to form tridymite) may be exploited to advantage. Major improvements in quality are observed by depositing at 500° C. or at 600° C.

The luminescence performance has been monitored by cathodoluminescence and compared with single crystal luminescence of ruby and titanium sapphire samples. After the annealing treatments the thin film samples produce comparable spectra and luminescence intensity to that of bulk crystals for the same excitation conditions, even for non-optimised samples. These spectra are characteristic of the upper regions of the film and are independent of the substrate.

EXAMPLE 1

FIG. 1 shows the ruby line spectra for a Cr/Ti doped 1.9 micron thick film sputter-deposited onto a quartz substrate as above and after annealing in oxygen at 1,200° C. for 2 hours. In this example where chromium was introduced as a contaminant, the chromium line contribution was approximately 80% as intense as from a commercial bulk ruby. The titanium was 0.4%, the $Al_2O_3$ 99.6 mole %. The spectrum was obtained from a 10 kV 0.3 $\mu$A beam at room temperature and was attenuated by a 6.2% filter.

EXAMPLE 2

FIG. 2 is the corresponding spectrum for a 1.55 micron thick film of titanium sapphire deposited on quartz. After deposition the film was heat treated in a hydrogen furnace at 1,200° C. for 4 hours. In this example the trace impurity, Cr, has been suppressed by the processing. The spectral response is as for bulk titanium sapphire and in this example the intensity was 95% that of the commercial crystals. The Ti was 0.4% and $Al_2O_3$ 99.6 mole %. The spectrum was obtained from a 10 kV 0.5 $\mu$A beam at room temperature and was attenuated by a 6.2% filter.

We claim:

1. A method of making a laser waveguide, comprising the steps of:
   sputter-depositing an alloy of aluminum and a transition metal dopant onto a waveguide substrate in an oxidizing atmosphere; and
   annealing the waveguide in an atmosphere which controls the oxidation state of the dopant to a desired value.

2. A method according to claim 1, wherein a molar ratio of the transition metal dopant to aluminum is in a range of from 1:100 to 1:10,000.

3. A method according to claim 1, wherein said sputter-depositing step comprises maintaining the waveguide substrate in a range of from 400° C. to 700° C.

4. A method according to claim 1, wherein said sputter-depositing step comprises maintaining the waveguide substrate in a temperature range of from one-third to two-thirds of the way between room temperature and a temperature at which said annealing step is conducted.

5. A method according to claim 1, further comprising encasing the laser waveguide in a silica cladding overlayer.

6. A method of making a laser waveguide, comprising the steps of:

sputter-depositing an alloy of aluminum and a transition metal dopant onto a waveguide substrate in an oxidizing atmosphere; and annealing the waveguide and thereafter ion-implanting hydrogen to control the oxidation state of the dopant.

7. A method according to claim 6, wherein a molar ratio of the transition metal dopant to aluminum is in a range of from 1:100 to 1:10,000.

8. A method according to claim 6, wherein said sputter-depositing step comprises maintaining the waveguide substrate in a range of from 400° C. to 700° C.

9. A method according to claim 6, wherein said sputter-depositing step comprises maintaining the waveguide substrate in a temperature range of from one-third to two-thirds of the way between room temperature and a temperature at which said annealing step is conducted.

10. A method according to claim 6, further comprising encasing the laser waveguide in a silica cladding overlayer.

* * * * *